Sept. 27, 1960          R. HUNTER                    2,954,340
         TREATMENT OF HYDROCARBON CONTAINING
              MIXTURES WITH AQUEOUS MEDIA
                  Filed Dec. 13, 1955
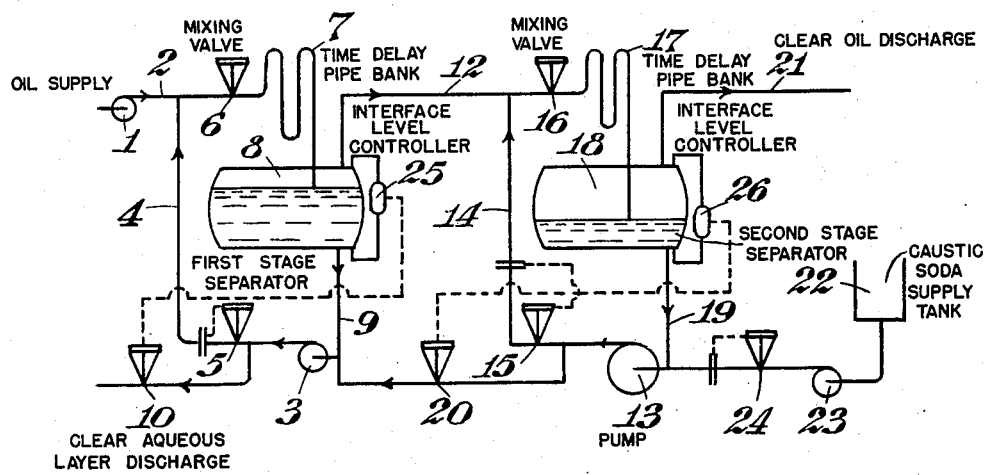
INVENTOR:
RODGER HUNTER
BY: Morgan, Finnegan, Durham & Pine
ATTORNEYS

# 2,954,340

TREATMENT OF HYDROCARBON CONTAINING MIXTURES WITH AQUEOUS MEDIA

Rodger Hunter, Abadan, Iran, assignor to The British Petroleum Company Limited, London, England, a British joint-stock corporation Filed Dec. 13, 1955, Ser. No. 552,894

Claims priority, application Great Britain Dec. 13, 1954

13 Claims. (Cl. 208—228)

This invention relates to an improved process for the treatment of hydrocarbon-containing mixtures with aqueous media.

In the treatment of hydrocarbon-containing mixtures with aqueous solutions containing alkali bases, difficulties have been experienced in subsequently effecting separation of the hydrocarbon phase and aqueous phase due to the entrainment (in dispersion) of a small proportion of treating solution in the recovered hydrocarbons. The entrained treating solution can, to a large extent, be removed from the hydrocarbons by the use of coalescers and/or subsequent water washing stages. Nevertheless the equipment necessary to remove entrained solution is costly to install and in operation there is an irretrievable loss of treating solution accompanied by a consumption of process utilities.

In the application of treating processes, as above described, to the refining of petroleum distillate fractions, the ratio of treating solution to distillate fraction under conventional treating conditions lies in the range 1:20 to 1:1. In the prior art reference is to be found to the possibility of using higher ratios but these references have been related to single stage contacting operations.

It has now been found that at very high contacting ratios of treating solution/hydrocarbon containing feedstock, i.e. of the order of 3:1 to 4:1, there is a fundamental change in the physical condition of the mixture and that by utilising this effect under the operating conditions described hereinafter, a substantial reduction can be made in the overall cost of installation and operation of the treating operation. Thus, it is found, when using ratios of treating solution/feedstock of the order of 1:50, the feedstock forms the continuous liquid phase and the treating solution forms the discontinuous (that is, dispersed) liquid phase. However, when using ratios of treating solution/feedstock of the order of 4:1 the treating solution forms the continuous phase and the feedstock forms the discontinuous phase. Under the latter conditions, the treated feedstock is separable with much reduced entrainment of treating solution; there will, however, in some cases be a substantial entrainment of feedstock in recovered treating solution.

It is an object of the present invention to provide an economically attractive process for the treatment of hydrocarbon-containing mixtures with aqueous media. It is a further object to provide a process for the treatment of hydrocarbon-containing mixtures with aqueous media in which losses of said media are reduced. It is a further object to provide an improved process for the treatment of petroleum distillate fractions. Other objects of the invention will appear hereinafter.

According to the present invention these objects are accomplished by a process which comprises contacting a hydrocarbon-containing feedstock with an aqueous medium in at least two separate contacting stages, wherein the final contacting stage is operated under conditions such that the treating medium constitutes a continuous liquid phase and the feedstock constitutes a discontinuous liquid phase dispersed in said treating medium and wherein at least one prior contacting stage is operated under conditions such that the feedstock constitutes a continuous liquid phase and the treating medium constitutes a discontinuous liquid phase dispersed in said feedstock, after each contacting stage the phases being separated by decantation, the feedstock being passed forward progressively to each successive stage and the treating medium being introduced at the final stage, passed back through preceding stages and recovered from the initial stage.

In a simple embodiment of the invention there is operated a two stage contacting process, the first stage being fed with fresh feedstock and treating medium recovered from the second stage and the second stage being fed with once treated feedstock and fresh treating medium. In the first stage there is employed a relatively low ratio of treating medium/feedstock whereby there is formed a treating medium-in-feedstock dispersion. In the second stage there is employed a relatively high ratio of treating medium/feedstock whereby there is formed a feedstock-in-treating medium dispersion.

If desired the above embodiment may be modified by the operation of two or more stages at low treating medium/feedstock ratios before the final stage.

Preferred feedstocks to the process of the present invention are mineral oil distillate fractions such as petroleum, coal tar and shale oil distillate fractions. The process is suitable for the treatment of fractions having initial boiling points (corrected to atmospheric pressure) as low as $-47°$ F. ($C_3$ hydrocarbons) or as high as $750°$ F. (gas oil components). Suitable fractions are, thus, gasoline, naphtha, kerosine, white spirit, diesel fuel and gas oil fractions.

The process may be operated at ambient temperatures or, if desired, at higher or lower temperatures. While atmospheric pressures are normally suitable, if desired sub-atmospheric or superatmospheric pressures may be employed.

The process of the invention is suitable for the operation of a water washery. In this case the treating medium employed is usually water free of added reagents. The process is, however, very suited to alkali washing, the aqueous medium being, in this case, a solution of an alkali or alkaline earth base in water. Suitable bases include sodium, potassium and calcium hydroxides and sodium and potassium carbonates.

Thus for the removal of acids and/or phenols and/or sulphur-containing compounds from mineral oil fractions an aqueous caustic alkali solution may be employed.

The invention is not limited to the use of an aqueous medium consisting of water or of solutions of alkali bases alone and the process is of particular value for the operation of the solutiser process wherein the treating solution comprises caustic alkali together with an agent for promoting solubility of the extractable substances in the aqueous phase. Suitable agents for this purpose are well-known in the art and include methyl alcohol, potassium iso-butyrate and alkali metal phenolates and thiophenolates, said phenolates and thiophenolates being either added to or derived from the feedstock. As is well-known in the art, the treating solution may include catalysts, for assisting in the regeneration of spent solution, such as tannins or oxidizing agents such as alkali metal hypochlorites, ferricyanides and copper cresylate.

The process of the invention is particularly suitable for the caustic washing of distillate diesel fuels and for the solutizer treatment of gasoline.

The contacting stages may be operated with the application of known mixing devices. Thus, there may be employed paddle or propeller stirred vessels or the mixing may be carried out in closed circuit employing circulating pumps and orifice or valve mixers.

Preferably the volume ratio of the aqueous medium to the feedstock in the final stage lies in the range 2:1 to 10:1. Preferably the volume ratio of the aqueous medium to the feedstock in at least one stage, and preferably all stages, prior to the final stage lies in the range 1:100 to 1:4.

The invention is illustrated but in no way limited with reference to the accompanying drawing which is a schematic representation of a plant for the washing of a hydrocarbon-containing mixture with caustic alkali solution. The apparatus and method hereinafter described is particularly suitable for the treatment of a distillate diesel fuel, either straight run or catalytically or thermally cracked or blends thereof, boiling in the range 200°–350° C. The caustic solution will, in general, contain 20%–50% wt./volume of sodium or potassium hydroxide.

The object of the treatment is to extract acidic bodies and thereby improve the quality of the fuel whereby it may be stored over long periods without deterioration in either colour or gum. Fuel so treated will remain clear and is easily handled in modern diesel engine fuel systems without choking the types of filters usually associated with them. Among the acidic bodies removed are alkyl or aryl mercaptans and phenolic bodies. The treatment is preferably carried out in a closed system in the absence of air. The caustic alkali solution may be regenerated by any convenient means and reused or, as in the example, fresh caustic alkali may be passed through the system only once and discarded with the acidic impurities.

With reference to the drawing, the feedstock stream enters the system direct from a distillation unit disposal pump 1 and through pipe 2 under a pressure sufficiently high to carry the hydrocarbon stream right through the plant. At a point in pipe 2 the diesel oil meets a stream of caustic soda solution supplied by pump 3 through a line 4 from tank 8. The pneumatic control valve 5 is arranged to control the volume of caustic soda solution automatically to between 1 and 3% of the volume of the diesel oil stream in pipe 2 that is, to a caustic soda solution/diesel oil volume ratio between 1:100 and 1:33⅓. The mixture then passes through the pneumatically controlled mixing valve 6 which imposes a predetermined pressure drop of between 5 and 10 lbs. per sq. in. gauge. The resulting water-in-oil emulsion is maintained as such for a period of 5 to 15 seconds in the bank of pipes 7 and then enters the vessel 8. In this vessel partial separation occurs such that the aqueous layer is clear when leaving by line 9 but the oil layer still contains dispersed fine droplets of aqueous phase which would, left to themselves, remain in suspension possibly for several weeks. The clear aqueous layer flows by line 9 to pump 3. A quantity of aqueous layer is allowed to escape when pneumatic valve 10 opens due to a rise in interface level in tank 8 which operates the appropriate interface level control mechanism 25. This increase in the volume of caustic soda solution in tank 8 is caused by transfer from the second stage as hereinafter described.

The hydrocarbon stream containing dispersed caustic soda solution passes from tank 8 by means of pipe 12 to tank 18 constituting the second stage of treatment. A stream of caustic soda solution from tank 18 is introduced in pipe 12 by a pump 13 through a pipe 14. The treating solution/feedstock volume ratio is controlled by pneumatic valve 15 and differs from that in the first stage of treatment in quantity; the volume ratio in the stream passing along pipe 12 being 5:1. The pump 13 is therefore relatively large compared either to pumps 1 or 3. The resulting mixture in pipe 12 enters a pneumatically controlled mixing valve 16 which automatically controls the pressure drop through the said valve to between 5 and 10 lbs./sq. in. gauge. The resulting oil in water emulsion is maintained as such for a period of 5 to 15 seconds in the bank of pipes 17 and then enters the vessel 18. In this vessel a separation occurs but this time the hydrocarbon layer leaving by pipe 21 is clear of aqueous droplets and may, without further treatment, be sent to storage and distribution. The aqueous layer leaving tank 18 by pipe 19 will contain suspended oil droplets, which would remain in that state for considerable periods of time. This caustic soda solution is transferred to the first stage of treatment by the opening of pneumatic valve 20, under the control of the interface level controller 26 attached to tank 18. The fresh caustic soda solution required for the treatment is supplied from tank 22 by pump 23. The quantity is set to 0.5% by volume of the diesel oil stream in pipe 2 by the valve 24. It is necessary that the valves 15 and 20 are designed so that the pressure on the upstream sides exceed that on the suction side of pump 3; this makes certain that a quantity of caustic soda solution passes from stage 2 to stage 1 sufficient to maintain the interface level in tank 18 at a convenient height which may well be about one third full of aqueous layer. This will ensure that the oil layer has a reasonable time to clear. In the first stage of treatment the interface level is set high at say two thirds full of aqueous layer. This ensures a reasonable time for the aqueous layer to clear of oil droplets. The ends of the contact pipes 7 and 17 inside tanks 8 and 18 respectively should be arranged so as to disturb the clear layers as little as possible. That is, the end of 7 should be just above the interface and the end of 17 just below the interface.

I claim:

1. A process for the treatment of a hydrocarbon-containing feedstock comprising a first stage of treatment wherein a hydrocarbon-containing feedstock is mixed with an aqueous medium in a mixing zone in a ratio sufficient to produce an admixture in which the feedstock constitutes the continuous phase and the aqueous medium constitutes the discontinuous phase, the admixed feedstock is passed to a separation zone to effect at least a partial separation of the admixed feedstock into an aqueous layer and a hydrocarbon-containing layer, and the hydrocarbon-containing layer is separated by decanting, and at least one more stage of treatment wherein the hydrocarbon-containing layer is mixed with an aqueous medium in another mixing zone, the admixed feedstock is passed to another separation zone to effect a separation of the admixed feedstock into an aqueous layer and a hydrocarbon-containing layer and the hydrocarbon-containing layer is separated by decanting, the ratio of the hydrocarbon-containing layer and the aqueous medium employed in the final stage of treatment being sufficient to produce an admixture in which the aqueous medium constitutes a continuous liquid phase and the feedstock constitutes a discontinuous liquid phase dispersed in said aqueous medium, the feedstock being passed forwardly progressively to each successive stage of treatment and the aqueous medium being introduced at the final stage of treatment being passed back through preceding stages and recovered from the initial stage.

2. A process as specified in claim 1 in which the aqueous medium is an aqueous solution of an alkali base.

3. A process as specified in claim 2 in which the alkali base is sodium hydroxide.

4. A process as specified in claim 3 in which the feedstock is a distillate diesel oil of petroleum origin.

5. A process as specified in claim 3 in which the aqueous medium is an aqueous solution of an alkali base, said solution also containing an agent for promoting the solubility of the sulphur-containing compounds in the aqueous phase.

6. A process according to claim 5 in which said agent is potassium iso-butyrate.

7. A process according to claim 5 in which said agent is an alkali metal phenolate.

8. A process as specified in claim 5 in which the feedstock is a gasoline of petroleum origin.

9. A process as specified in claim 1 in which the feedstock is contacted with an aqueous medium in two and only two stages of treatment.

10. A process as specified in claim 1 in which the feedstock is a petroleum distillate fraction.

11. A process as specified in claim 1 in which the aqueous medium is water.

12. A process as specified in claim 1 in which the volume ratio of the aqueous medium to the feedstock in said final stage lies in the range 2:1 to 10:1.

13. A process as specified in claim 1 in which the volume ratio of the aqueous medium to the feedstock in at least one stage prior to said final stage lies in the range 1:100 to 1:4.

References Cited in the file of this patent

UNITED STATES PATENTS

| | | |
|---|---|---|
| 1,704,246 | Halloran | Mar. 5, 1929 |
| 2,146,353 | Rosenbaugh | Feb. 7, 1939 |
| 2,349,812 | Day et al. | May 30, 1944 |
| 2,570,277 | Richards et al. | Oct. 9, 1951 |
| 2,572,519 | Richards et al. | Oct. 23, 1951 |
| 2,725,340 | Gordon et al. | Nov. 29, 1955 |
| 2,794,767 | Glein et al. | June 4, 1957 |